US012749857B2

(12) United States Patent
Dong et al.

(10) Patent No.: US 12,749,857 B2
(45) Date of Patent: Sep. 29, 2026

(54) SUB CONNECTOR, CONNECTOR, AND CONNECTOR ASSEMBLY

(71) Applicants: Tyco Electronics (Suzhou) Ltd., Suzhou City (CN); Tyco Electronics Technology (SIP) Ltd., Suzhou (CN)

(72) Inventors: Zhide Dong, Suzhou (CN); Zhiming Feng, Suzhou (CN); Yingying Ji, Suzhou (CN)

(73) Assignees: Tyco Electronics Technology (SIP) Ltd., Suzhou (CN); Tyco Electronics (Suzhou) Ltd., Suzhou City (CN)

( * ) Notice: Subject to any disclaimer, the term of this patent is extended or adjusted under 35 U.S.C. 154(b) by 552 days.

(21) Appl. No.: 18/359,390

(22) Filed: Jul. 26, 2023

(65) Prior Publication Data

US 2024/0039216 A1 Feb. 1, 2024

(30) Foreign Application Priority Data

Jul. 26, 2022 (CN) ........................ 202221935968.X

(51) Int. Cl.
*H01R 13/6585* (2011.01)
*H01R 13/40* (2006.01)

(52) U.S. Cl.
CPC ......... *H01R 13/6585* (2013.01); *H01R 13/40* (2013.01)

(58) Field of Classification Search
CPC .................................................... H01R 13/514
USPC .......................................................... 439/701
See application file for complete search history.

(56) References Cited

U.S. PATENT DOCUMENTS

| | | | |
|---|---|---|---|
| 6,905,367 B2 | 6/2005 | Crane, Jr. et al. | |
| 10,916,895 B2 | 2/2021 | Chen | |
| 2018/0145463 A1* | 5/2018 | Kiyuna .................. | H01R 13/64 |

FOREIGN PATENT DOCUMENTS

| | | |
|---|---|---|
| FR | 2952761 A1 | 5/2011 |
| WO | 2011058501 A1 | 5/2011 |

OTHER PUBLICATIONS

Extended European Search Report dated Dec. 4, 2023, corresponding to Application No. 23187238.3-1201, 8 pages.

* cited by examiner

*Primary Examiner* — Phuong K Dinh
(74) *Attorney, Agent, or Firm* — Barley Snyder

(57) ABSTRACT

A sub connector includes a sub housing, a first terminal fixed in the sub housing, and a shielding shell fixed to the sub housing and at least partially enclosing the first terminal. The sub connector is detachably inserted into a mother housing to form a connector with the mother housing. The sub connector has a sub connecting end for electrically connecting with an electrical component and a sub mating end for electrically mating with a mating connector.

20 Claims, 10 Drawing Sheets

SUB CONNECTOR, CONNECTOR, AND CONNECTOR ASSEMBLY

CROSS-REFERENCE TO RELATED APPLICATION

This application claims the benefit of the filing date under 35 U.S.C. § 119(a)-(d) of Chinese Patent Application No. 202221935968.X, filed on Jul. 26, 2022.

FIELD OF THE INVENTION

The present invention relates to a sub connector, a connector including the sub connector and a connector assembly including the connector.

BACKGROUND

In the prior art, a connector typically includes a housing, a shielded shell, and terminals. The shielding shell and terminals are inserted into the housing, and the terminals are surrounded by the shielding shell. In the prior art, when some terminals in the connector are damaged, the entire connector must be replaced as a whole, resulting in higher costs. In addition, in the prior art, all terminals are received in the same shielding shell, which cannot prevent signal interference between the terminals in the connector.

SUMMARY

A sub connector includes a sub housing, a first terminal fixed in the sub housing, and a shielding shell fixed to the sub housing and at least partially enclosing the first terminal. The sub connector is detachably inserted into a mother housing to form a connector with the mother housing. The sub connector has a sub connecting end for electrically connecting with an electrical component and a sub mating end for electrically mating with a mating connector.

BRIEF DESCRIPTION OF THE DRAWINGS

The features of the present invention will become more apparent by describing in detail exemplary embodiments thereof with reference to the accompanying drawings, in which.

DETAILED DESCRIPTION OF THE EMBODIMENT(S)

Figure 1:
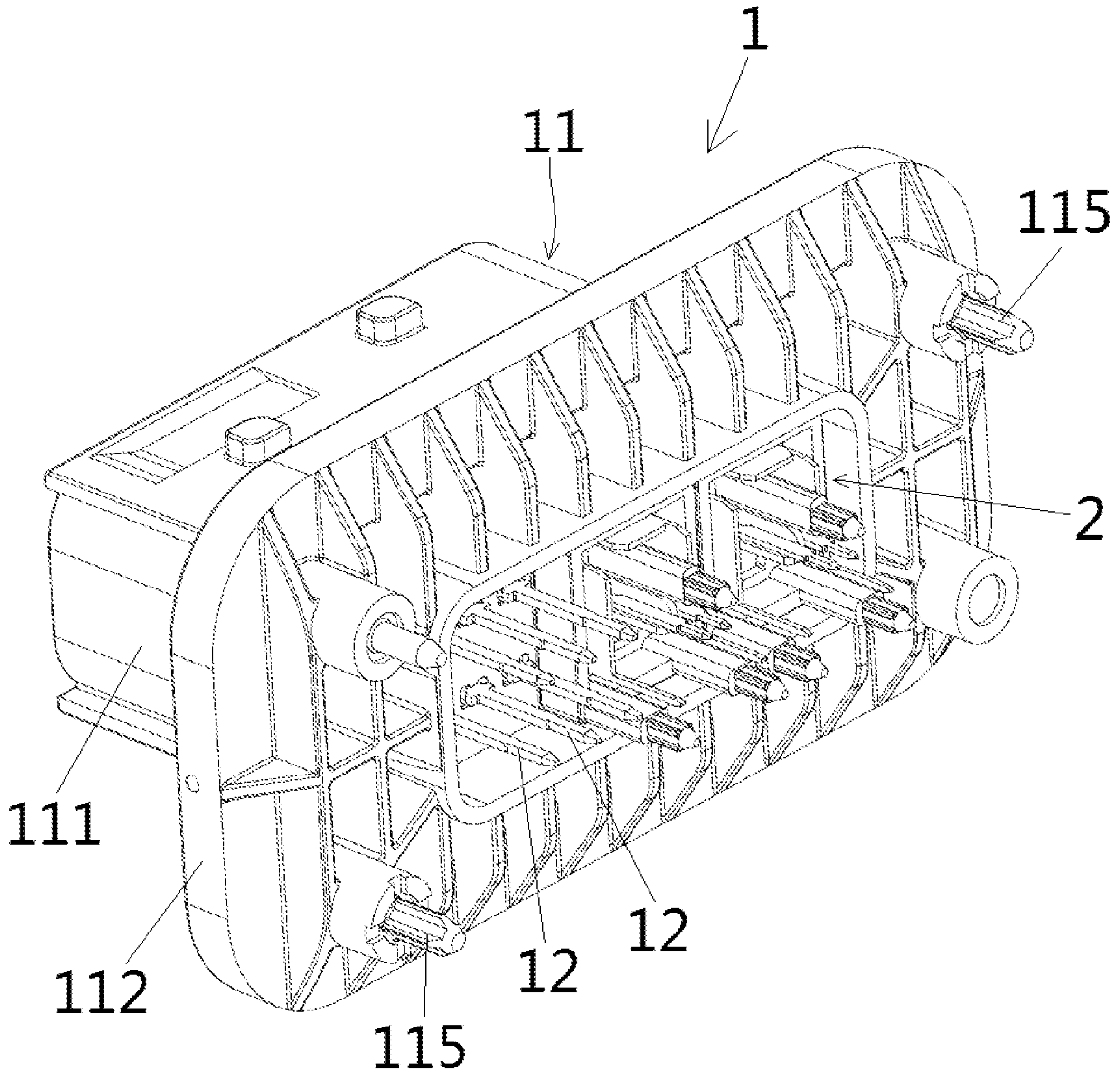
FIG. 1 is a perspective view of a connector according to an embodiment.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A sub connector according to an embodiment comprises a sub housing 21, a first terminal 22 fixed in the sub housing 21, and a shielding shell 23 fixed to the sub housing 21 and at least partially enclosing the first terminal 22. The sub connector 2 is detachably inserted into a mother housing 11 to form a connector 1 with the mother housing 11. The sub connector 2 has a sub connecting end 201 for electrically connecting to an electrical component 3 and a sub mating end 202 for electrically mating with a mating connector.

In another embodiment, a connector is provided. The connector comprises: a mother housing 11; and the aforementioned sub connector 2. The sub connector 2 is detachably inserted into the mother housing 11 to form a connector 1 with the mother housing 11.

According to another overall technical concept of the present invention, a connector assembly is provided. The connector assembly comprises: the above connector; and a mating connector mated with the connector.

Figure 2:
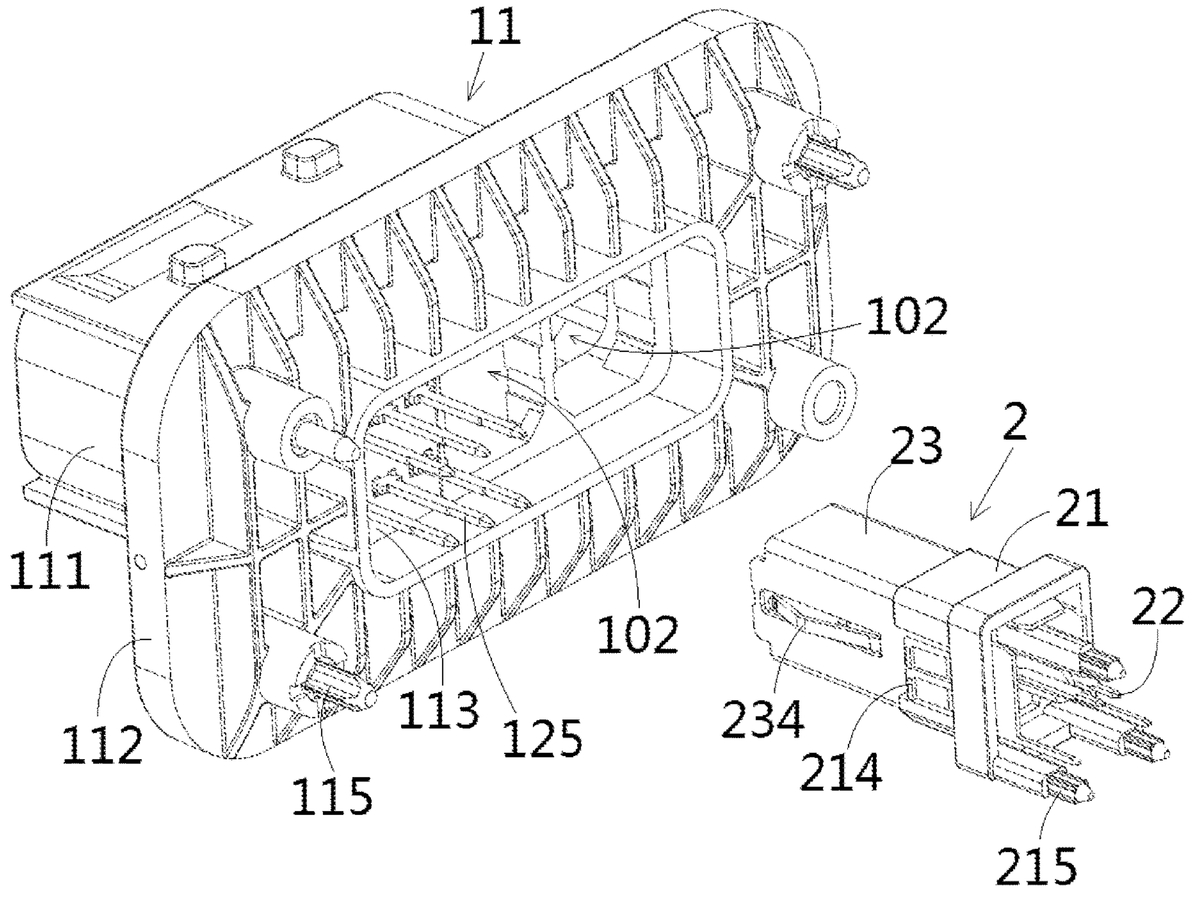
FIG. 2 is an exploded perspective view of the connector.
Figure 3:
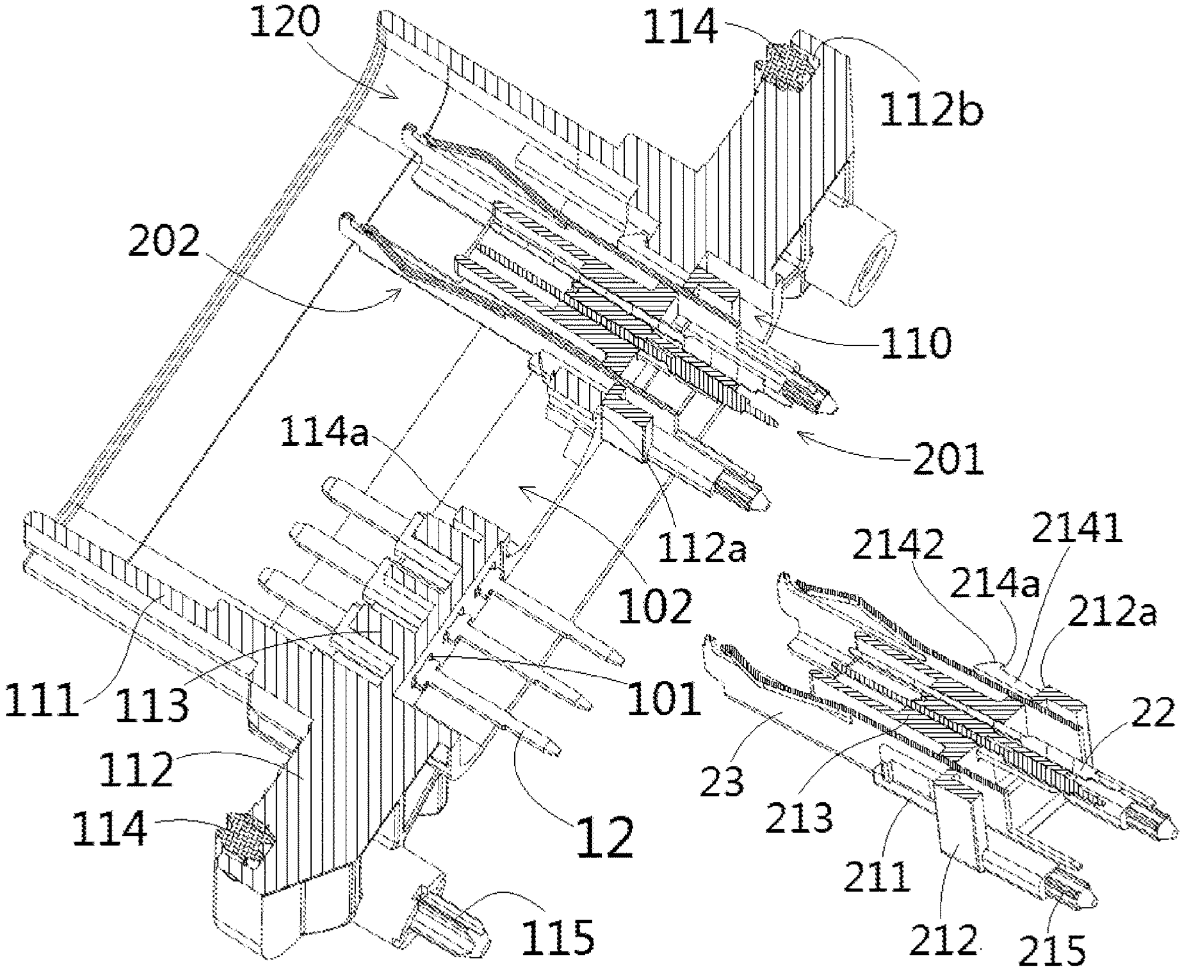
FIG. 3 is a sectional perspective view of the connector, in which a sub connector is not installed in a mother housing.

FIG. 1 shows an illustrative perspective view of connector 1 according to an exemplary embodiment of the present invention. FIG. 2 shows an illustrative exploded view of connector 1 according to an exemplary embodiment of the present invention. FIG. 3 shows a cross-sectional view of connector 1 according to an exemplary embodiment of the present invention, where one sub connector 2 is not installed in the mother housing 11.

As shown in FIGS. 1 to 3, in an exemplary embodiment of the present invention, a connector 1 is disclosed. The connector 1 includes a mother housing 11 and a sub connector 2. The sub connector 2 can be detachably inserted into the mother housing 11. In the illustrated embodiment, the sub connector 2 can also be referred to as a sub electrical module.

As shown in FIG. 2, the sub connector 2 includes: a sub housing 21, a first terminal 22, and a shielding shell 23. The first terminal 22 is fixed in the sub housing 21. The shielding shell 23 is fixed to the sub housing 21 and surrounds the first terminal 22. The connector 1 also includes a second terminal 12, shown in FIG. 3. The second terminal 12 is fixed in the mother housing 11. The function of the second terminal 12 is different from that of the first terminal 22.

As shown in FIGS. 1 to 3, in the illustrated embodiment, the connector 1 includes multiple sub connectors 2, each of which can be detachably inserted into the mother housing 11. In the shown embodiment, multiple sub connectors 2 are identical, allowing for the interchangeability of multiple sub connectors 2.

As shown in the embodiment of FIG. 3, the connector 1 is equipped with a connecting interface 110 and a mating interface 120, which are respectively used for electrical connection with an electrical component (such as a circuit board) 3 and a mating connector. The sub connector 2 has a sub connecting end 201 and a sub mating end 202. The sub connecting end 201 and the sub mating end 202 are respectively arranged in the connecting interface 110 and the mating interface 120 of the connector 11, and are electrically connected to the electrical component 3 and the mating connector.

As shown in FIG. 3, the mother housing 11 includes a second peripheral wall 111 and a second holder 113. The second peripheral wall 111 defines a second inner cavity. The second holder 113 is located in the second inner cavity and connected to the second peripheral wall 111. A sub connector slot 102 is formed on the second holder 113, and the sub connector 2 is inserted into the sub connector slot 102.

In the shown embodiment, the connector 1 further includes the second terminal 12, shown in FIG. 3. The second terminal 12 is located in the second inner cavity and fixed to the second holder 113. A second terminal slot 101 is also formed on the second holder 113, and a part of the second terminal 12 is inserted and fixed into the second terminal slot 101.

Figure 4:
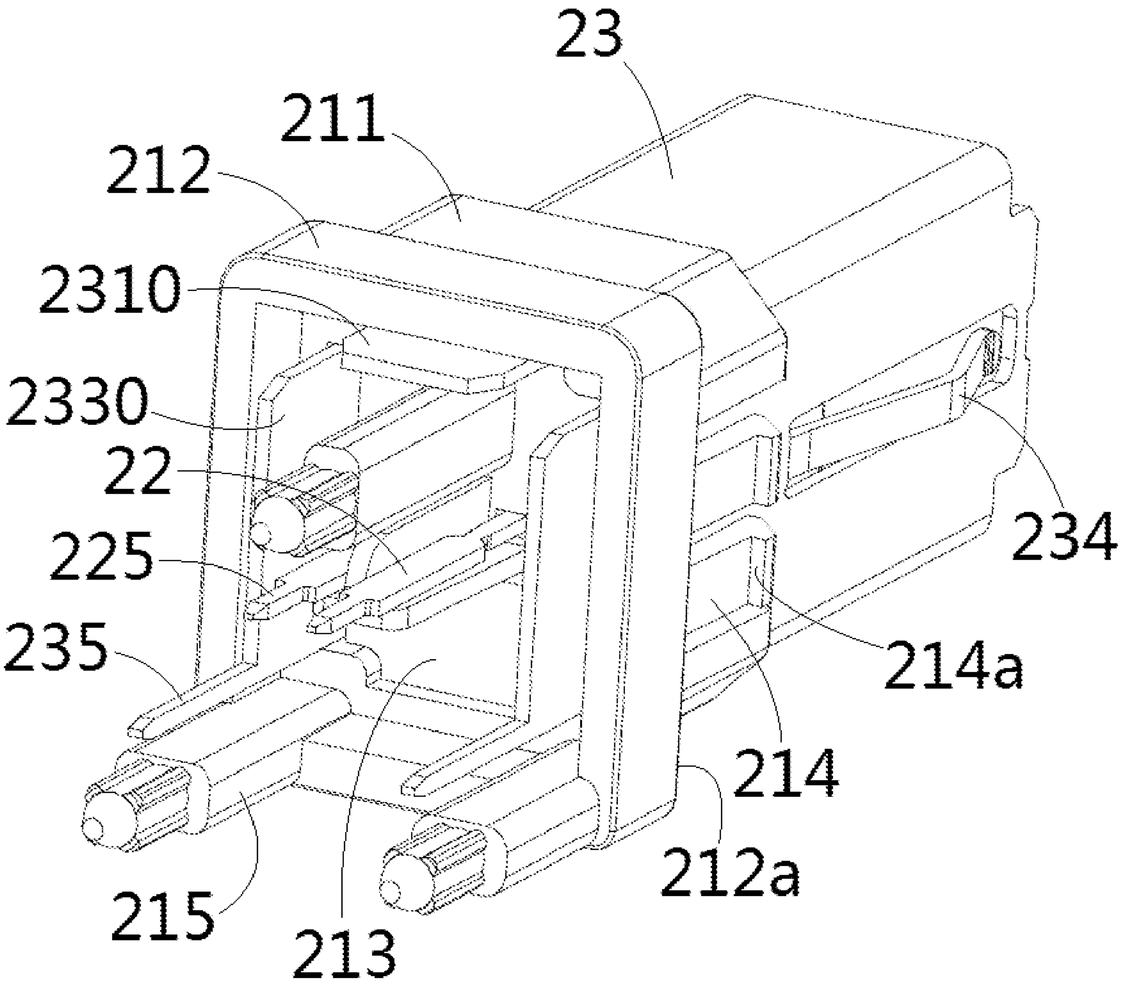
FIG. 4 is a rear perspective view of a sub connector according to an embodiment.
Figure 5:
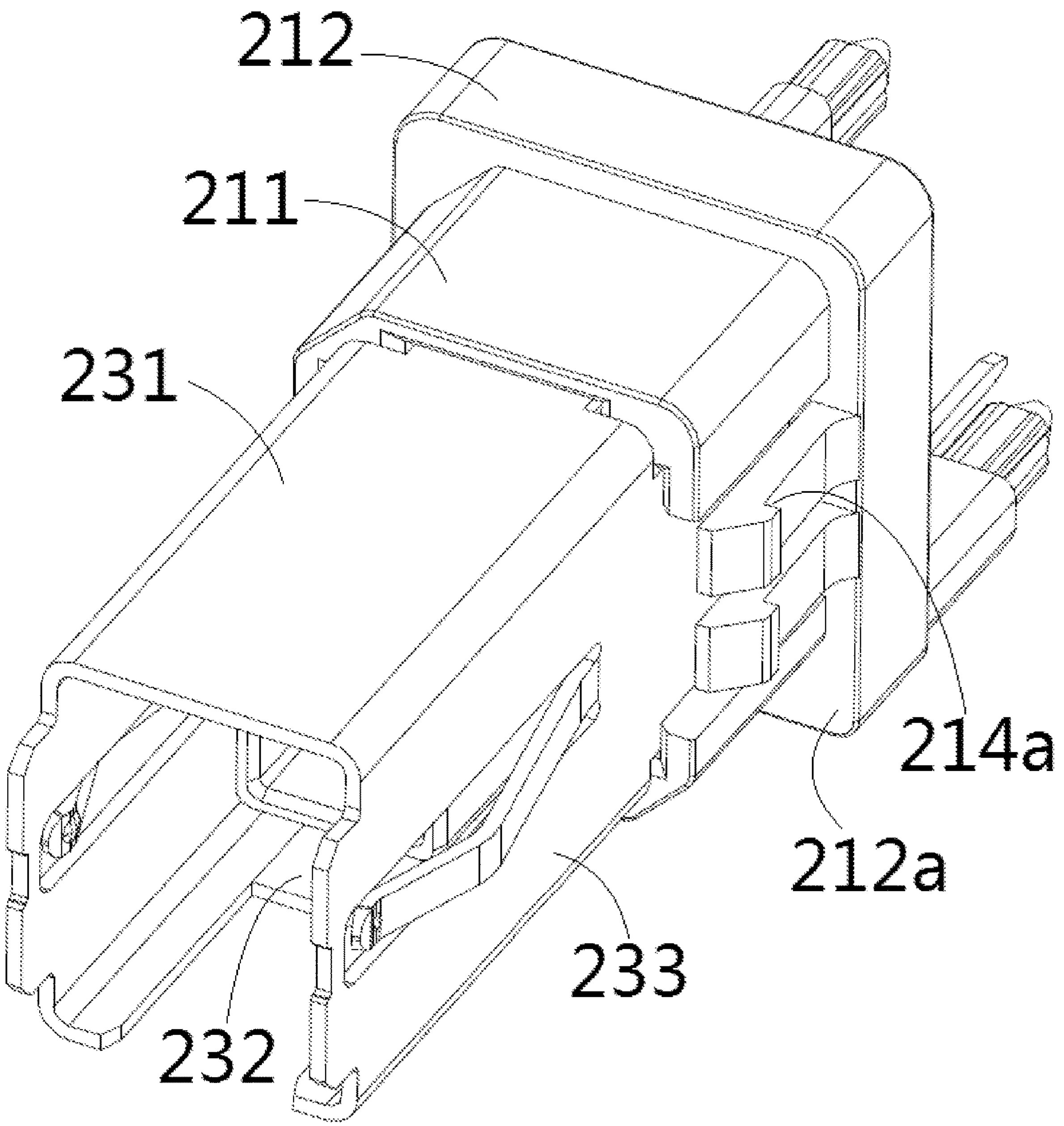
FIG. 5 is a front perspective view of the sub connector.
Figure 6:
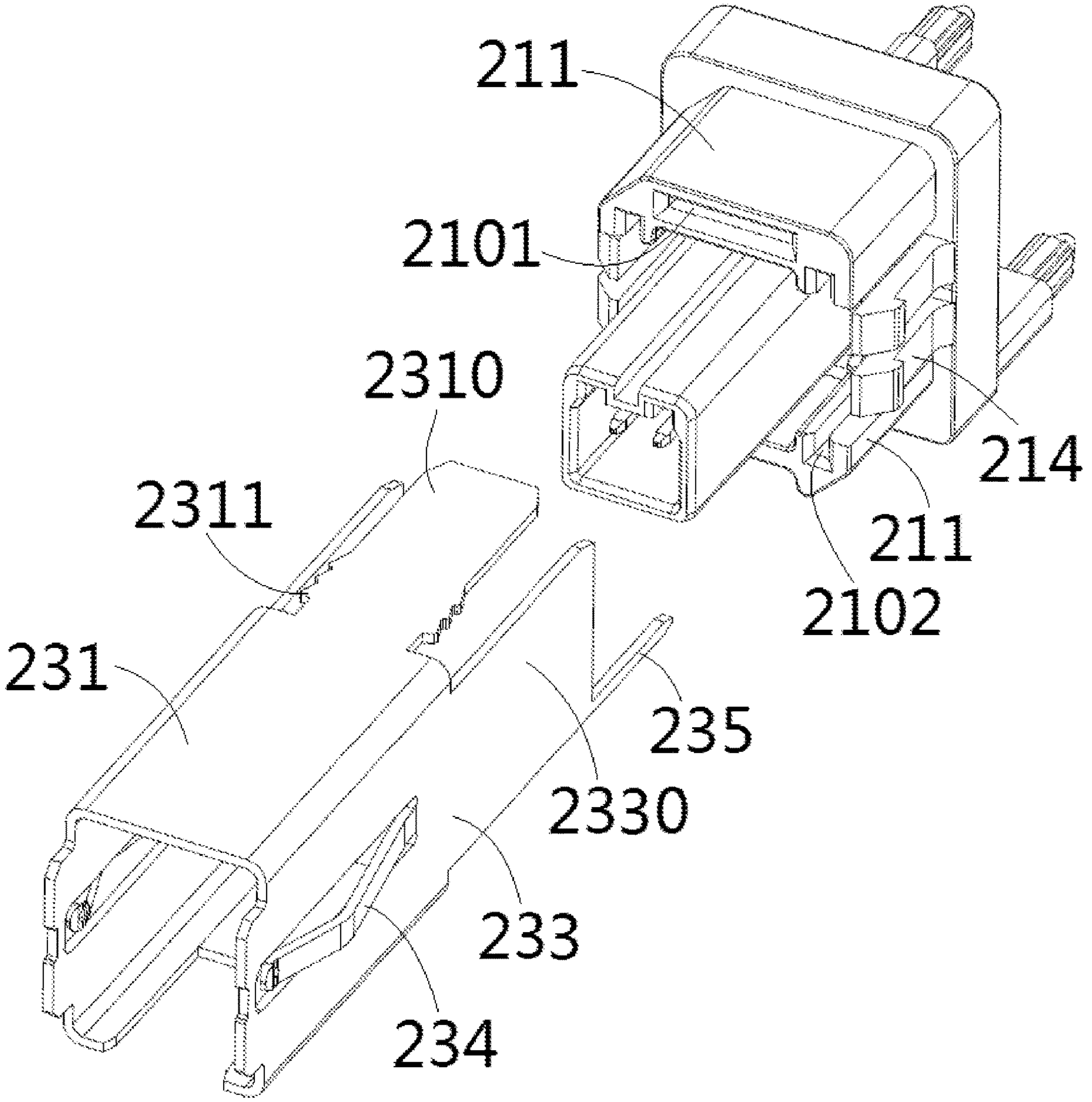
FIG. 6 is an exploded upper perspective view of the sub connector.
Figure 7:
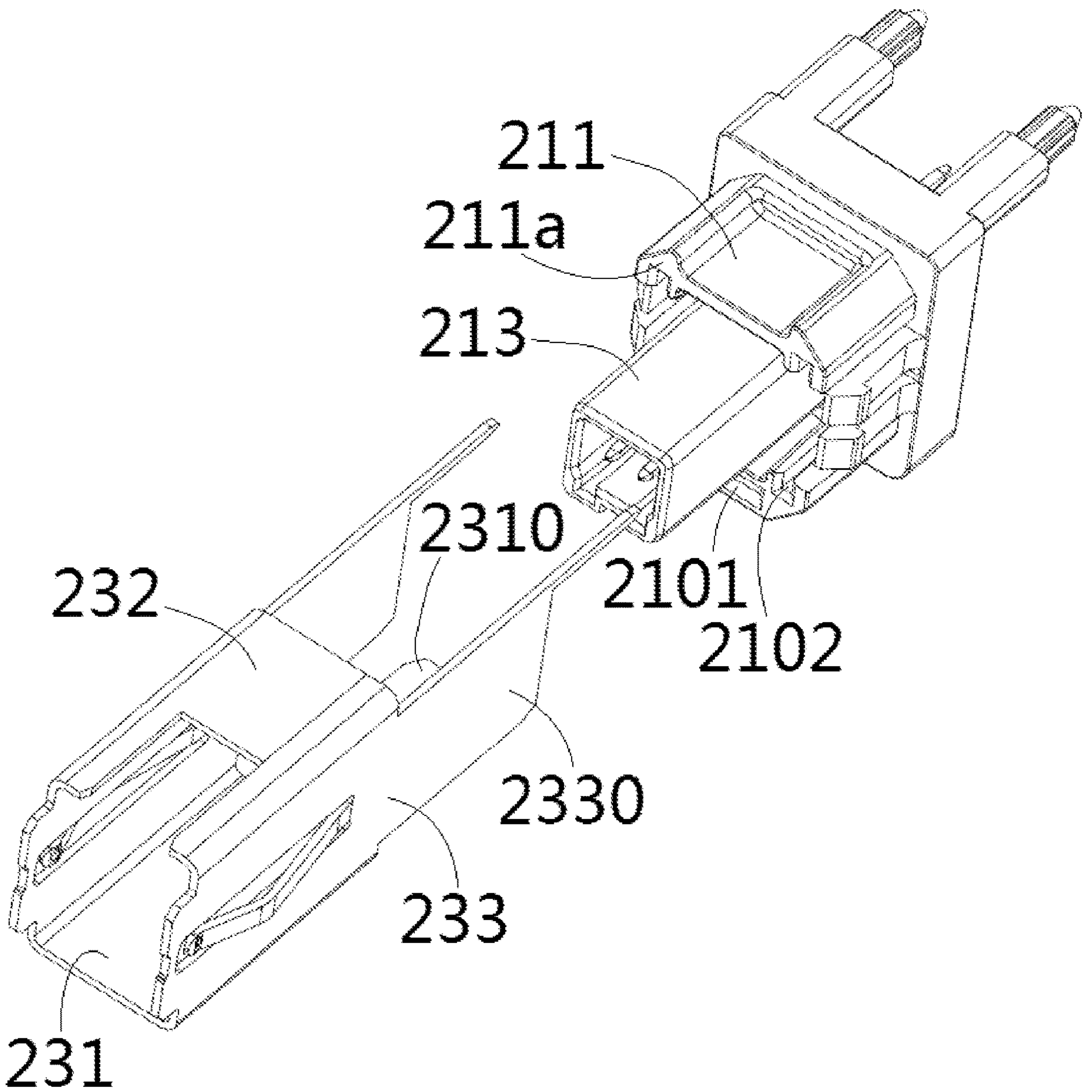
FIG. 7 is an exploded bottom perspective view of the sub connector.
Figure 8:
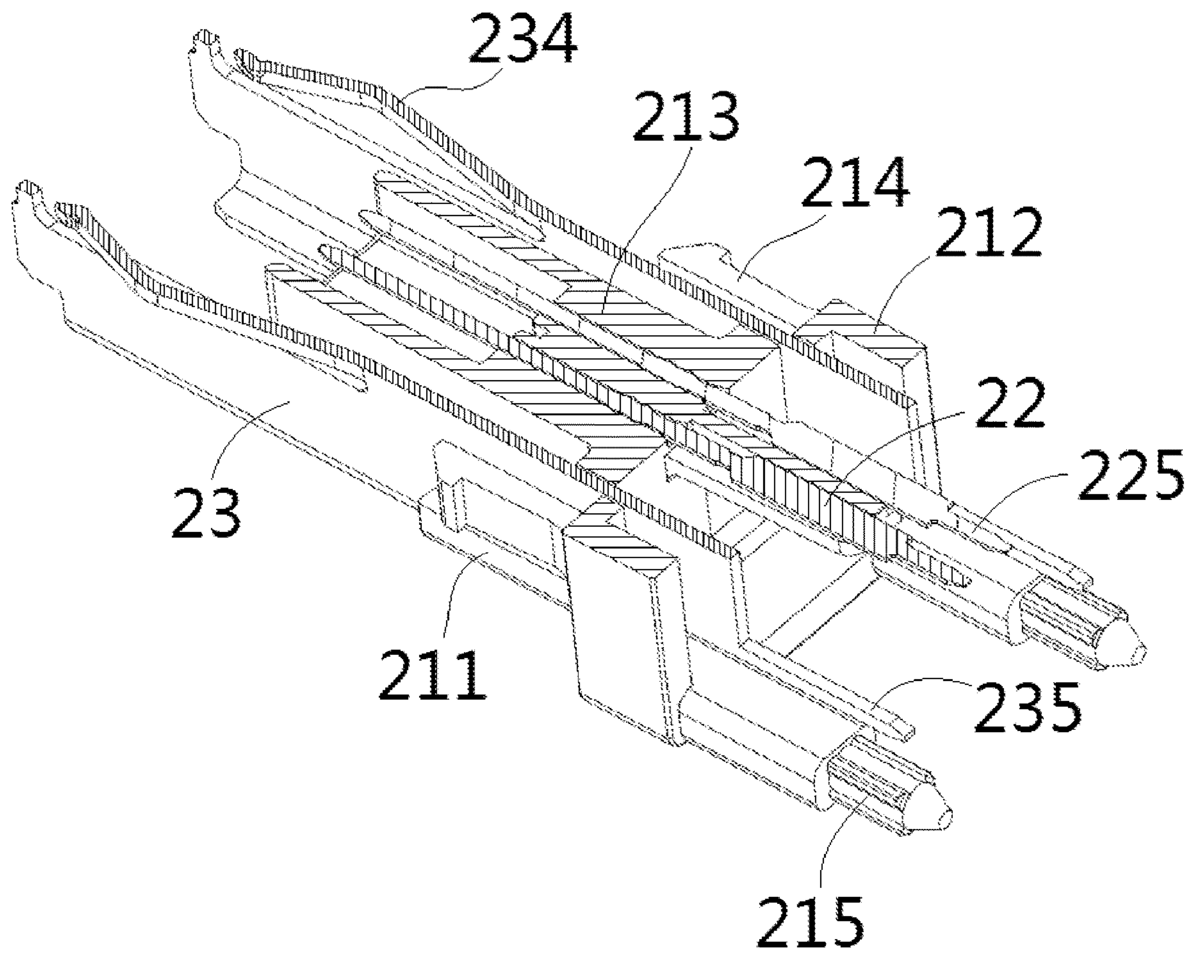
FIG. 8 is a sectional perspective view of the sub connector.

FIG. 4 shows an illustrative perspective view of the sub connector 2 according to an exemplary embodiment of the present invention when viewed from the rear end. FIG. 5 shows an illustrative perspective view of the sub connector 2 according to an exemplary embodiment of the present invention when viewed from the front end. FIG. 6 shows an illustrative exploded view of the sub connector 2 according to an exemplary embodiment of the present invention when viewed from the upper side. FIG. 7 shows an exploded schematic diagram of the sub connector 2 according to an exemplary embodiment of the present invention when viewed from the bottom. FIG. 8 shows an axial cross-sectional view of the sub connector 2 according to an exemplary embodiment of the present invention.

As shown in FIG. 3, in the illustrated embodiment, the sub housing 21 includes: a first peripheral wall 211, 212, and a first holder 213. The first peripheral wall 211 and 212 defines a first inner cavity. The first holder 213 is located in the first inner cavity and connected to the first peripheral wall 211 and 212. The first terminal 22 is located in the first inner cavity and fixed to the first holder 213. At least a part of the shielding shell 23 is located in the first inner cavity and fixed to the first holder 213. The first holder 213 and the shielding shell 23 extend axially beyond one end 211*a* of the first peripheral wall 211 and 212, and the first holder 213 is accommodated in the shielding shell 23.

As shown in FIGS. 2 to 4, an elastic buckle 214 is formed on the first peripheral wall 211 and 212, and a locking surface 214*a* is formed on the elastic buckle 214. A mating locking surface 114*a* is formed on the second holder 113, and the locking surface 214*a* is against the mating locking surface 114*a* to lock the sub connector 2 in a predetermined position. The elastic buckle 214 includes an elastic cantilever 2141 and a protrusion 2142. The protrusion 2142 is formed on the free end of the elastic cantilever 2141, and the locking surface 214*a* is formed on the protrusion 2142.

As shown in FIG. 3, the first peripheral wall 211 and 212 includes an insertion part 211 and a base part 212. The insertion part 211 is used to insert into the sub connector slot 102. The base part 212 is connected to one end of the insertion part 211 and adapted to be positioned outside the sub connector slot 102. A positioning surface 212*a* is formed on the base part 212, and a mating positioning surface 112*a* is formed on the second holder 113. The positioning surface 212*a* is against the mating positioning surface 112*a* to position the sub connector 2 in a predetermined position.

The sub connector 2 is inserted along the axial direction of the sub connector slot 102, and the locking surface 214*a* and the positioning surface 212*a* extend along the radial direction of the sub connector slot 102 and are spaced at a predetermined distance in the axial direction.

As shown in FIG. 3, in the illustrated embodiment, a first terminal slot is formed on the first holder 213, and a part of the first terminal 22 is inserted and fixed into the first terminal slot. The shielding shell slot 2101 and 2102, shown in FIG. 6, is formed on the insertion part 211 of the first peripheral wall 211 and 212, and a part of the shielding shell 23 is inserted and fixed into the shielding shell slot 2101 and 2102.

The shielding shell 23 includes a pair of first sidewalls 231 and 232 opposite to each other in a first direction, shown in FIG. 7, and the first direction is perpendicular to the axial direction of the shielding shell 23. One sidewall 231 of the first sidewalls 231 and 232 has a first tongue 2310, and the shielding shell slot 2101 and 2102 includes a first slot 2101 that is matched with the first tongue 2310. The other sidewall 232 in the pair of first sidewalls 231 and 232 extends to one end 211*a* of the first peripheral wall 211 and 212 and is not inserted into the first peripheral wall 211 and 212.

The shielding shell 23 includes a pair of second sidewalls 233 opposite to each other in a second direction, shown in FIGS. 6 and 7, with the second direction perpendicular to the axial direction of the shielding shell 23 and the first direction. The second sidewall 233 is equipped with a second tongue 2330, and the shielding shell slot 2101 and 2102 includes a second slot 2102 for mating with the second tongue 2330.

As shown in FIG. 6, a barbed protrusion 2311 is formed on the first tongue 2310 and/or the second tongue 2330, and the barbed protrusion 2311 is engaged with the inner wall of the shielding shell slot 2101 and 2102. An elastic contact part 234 is formed on the shielding shell 23, which is used for electrical contact with a mating shielding shell of a mating sub connector in the mating connector.

As shown in FIG. 3, in the illustrated embodiment, the mother housing 11 has a flange part 112 for installation on a mounting panel, and a sealing ring installation groove 112*b* is formed on one surface of the flange part 112. Connector 1 also includes a sealing ring 114 installed in the sealing ring installation groove 112*b*, which is used to achieve sealing between the flange part 112 and the installation panel.

Figure 9:
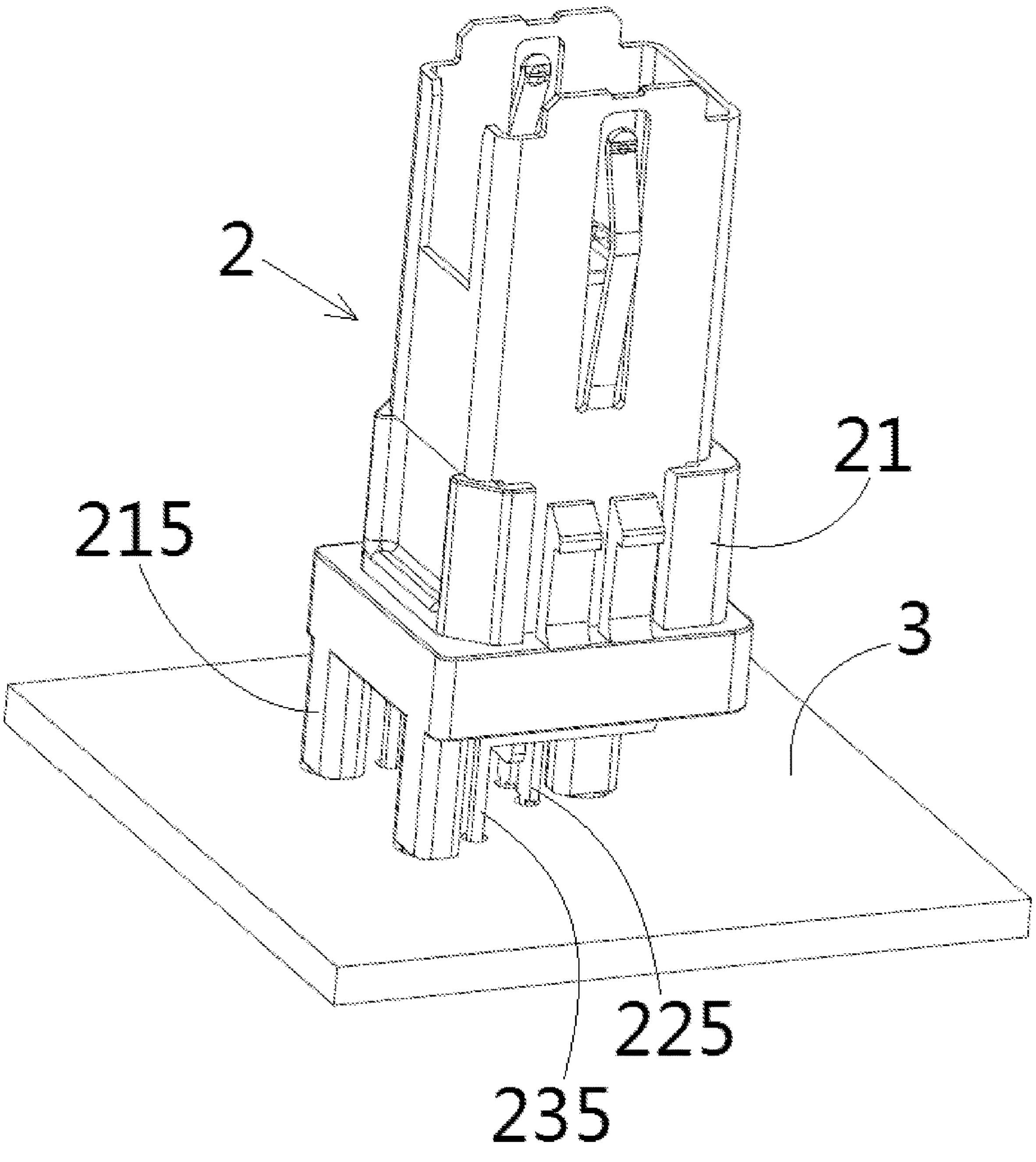
FIG. 9 is a perspective view of the sub connector installed on an electrical component according to an embodiment.
Figure 10:
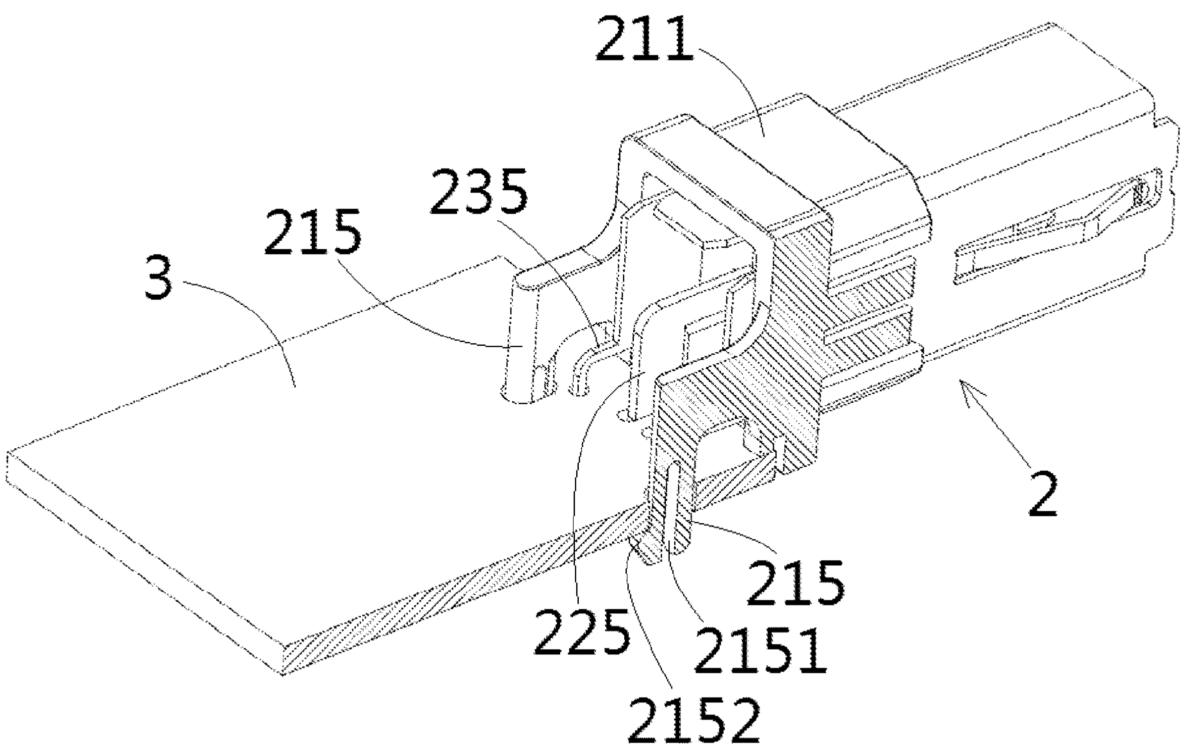
FIG. 10 is a sectional perspective view of the sub connector installed on an electrical component according to another embodiment.

FIG. 9 shows an illustrative perspective view of the sub connector 2 installed on the electrical component 3 according to an exemplary embodiment of the present invention. FIG. 10 shows an illustrative perspective view of the sub connector 2 installed on the electrical component 3 according to another exemplary embodiment of the present invention.

A second positioning post 115, shown in FIGS. 1 to 3, is formed on the mother housing 11, and a first positioning post 215 is formed on the sub housing 21. The second positioning post 115 and the first positioning post 215 are used for insertion and fixation into the corresponding holes on the electrical component 3, shown in FIGS. 9 and 10. In the illustrated embodiment, the electrical component 3 is a circuit board.

As shown in FIG. 10, in the illustrated embodiment, at least one of the second positioning post 115 and the first positioning post 215 is formed with a separation groove 2151 extending axially to allow the positioning post 215 to undergo radial elastic deformation. A radial protrusion 2152 is formed at the end of the positioning post 215, which is used to rest against the surface of the electrical component 3 to prevent the positioning post 215 from being pulled out of the hole on the electrical component 3.

As shown in FIGS. 3, 4, 9, and 10, a shielding pin 235, a second terminal pin 12, and a first terminal pin 225 are respectively formed on the shielding shell 23, the second terminal 12, and the first terminal 22 for plugging into the corresponding holes of the electrical component 3. The second positioning post 115, the first positioning post 215, the shielding pin 235, the second terminal pin 125, and the first terminal pin 225 extend along the axial direction of connector 1 or are bent 90 degrees relative to the axial direction of connector 1.

As shown in FIGS. 2 and 3, in the illustrated embodiment, the first terminal 22 of the sub connector 2 is a differential signal terminal, and the sub connector 2 includes a pair of differential signal terminals.

In another exemplary embodiment of the present invention, a connector assembly is also disclosed. The connector assembly includes: a connector 1 and a mating connector mated with the connector 1.

In the illustrated embodiments, the mating connector includes: a mating mother housing and a mating sub connector. The mating mother housing is used for mating with the mother housing. The mating sub connector can be detachably inserted into the mating mother housing for mating with the sub connector. The mating sub connector includes: a mating sub housing, a mating terminal, and a mating shielding shell. The mating sub housing is used to mate with the sub housing 21. The mating terminal is fixed to the mating sub housing for mating with the first terminal 22. The mating shielding shell is fixed to the mating sub housing and surrounds the mating terminal for mating with the shielding shell 23.

In the aforementioned exemplary embodiments of the present invention, when the terminal in the sub connector is damaged, the sub connector can be replaced separately without the need to replace the entire connector, thereby reducing the maintenance cost of the connector.

In addition, in the present invention, each sub connector includes a separate shielding shell, which can prevent signal interference between terminals in the connector and improve the anti electromagnetic interference performance of the connector.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A sub connector, comprising:

a sub housing;

a first terminal fixed in the sub housing; and a shielding shell fixed to the sub housing and at least partially enclosing the first terminal, the sub connector is detachably inserted into a mother housing to form a connector with the mother housing, the sub connector has a sub connecting end for electrically connecting with an electrical component and a sub mating end for electrically mating with a mating connector, the sub housing includes a first peripheral wall that defines a first inner cavity and a first holder located in the first inner cavity and connected to the first peripheral wall, the first terminal is located in the first inner cavity and fixed to the first holder, at least a part of the shielding shell is located in the first inner cavity and fixed to the first holder.

2. The sub connector according to claim 1, wherein the first holder and the shielding shell extend axially beyond one end of the first peripheral wall, the first holder is accommodated in the shielding shell.

3. The sub connector according to claim 1, wherein an elastic buckle is formed on the first peripheral wall and a locking surface is formed on the elastic buckle, the locking surface abuts against a mating locking surface formed on the mother housing to lock the sub connector in a predetermined position.

4. The sub connector according to claim 3, wherein the first peripheral wall includes:

an insertion part inserted into a sub connector slot formed in a second holder of the mother housing; and a base part is connected to one end of the insertion part and is positioned outside the sub connector slot, a positioning surface is formed on the base part, the positioning surface abuts against a mating positioning surface formed on the second holder to position the sub connector at the predetermined position.

5. The sub connector according to claim 4, wherein a first terminal slot is formed on the first holder, and a part of the first terminal is inserted and fixed into the first terminal slot, a shielding shell slot is formed on the insertion part of the first peripheral wall, and a part of the shielding shell is inserted and fixed into the shielding shell slot.

6. The sub connector according to claim 5, wherein the shielding shell has a pair of opposite first sidewalls, one of the first sidewalls has a first tongue, the shielding shell slot includes a first slot for mating with the first tongue, the other of the first sidewalls extends to one end of the first peripheral wall and is not inserted into the first peripheral wall.

7. The sub connector according to claim 6, wherein the shielding shell includes a pair of opposite second sidewalls, one of the second sidewalls has a second tongue, the shielding shell slot includes a second slot for mating with the second tongue, a barbed protrusion is formed on the first tongue and/or the second tongue, the barbed protrusion is engaged with an inner wall of the shielding shell slot.

8. The sub connector according to claim 1, wherein an elastic contact part is formed on the shielding shell, the elastic contact part is used for electrical contact with a mating shielding shell of a mating sub connector in the mating connector.

9. The sub connector according to claim 1, wherein the shielding shell is an integral piece.

10. The sub connector according to claim 1, wherein the sub housing has a first positioning post at the sub connecting end, the first positioning post mates with an insertion hole formed in the electrical component to fix the sub connector on the electrical component.

11. The sub connector according to claim 1, wherein the first terminal in the sub connector is a differential signal terminal, and the sub connector includes a pair of differential signal terminals.

12. A connector, comprising:

a mother housing including a second peripheral wall that defines a second inner cavity and a second holder located in the second inner cavity and connected to the second peripheral wall, a sub connector slot is formed in the second holder; and a sub connector including a sub housing, a first terminal fixed in the sub housing, and a shielding shell fixed to the sub housing and at least partially enclosing the first terminal, the sub connector is detachably inserted into the mother housing to form a connector with the mother housing, the sub connector has a sub connecting end for electrically connecting with an electrical component and a sub mating end for electrically mating with a mating connector, the sub connector is inserted into the sub connector slot.

13. The connector according to claim 12, further comprising a connecting interface for electrically connecting with the electrical component and a mating interface for electrically mating with the mating connector, the sub connecting end and the sub mating end of the sub connector are respectively arranged in the connecting interface and the mating interface of the connector.

14. The connector according to claim 12, further comprising a second terminal fixed in the mother housing, a function of the second terminal is different from a function of the first terminal.

15. The connector according to claim 12, wherein the sub connector is one of a plurality of sub connectors, each of the sub connectors is detachably inserted into the mother housing, the sub connectors are identical.

16. The connector according to claim 12, further comprising a second terminal located in the second inner cavity and fixed to the second holder, a second terminal slot is formed in the second holder, a part of the second terminal is inserted and fixed into the second terminal slot.

17. The connector according to claim 14, wherein a first positioning post, a first terminal pin, and a shielding pin are respectively formed on the sub housing, the first terminal, and the shielding shell of the sub connector for plugging into a plurality of corresponding holes formed in the electrical component, a second positioning post and a second terminal pin are respectively formed on the mother housing and the second terminal for plugging into the corresponding holes formed in the electrical component, the first positioning post, the second positioning post, the shielding pin, the first terminal pin, and the second terminal pin extend along the axial direction of the connector or are bent 90 degrees relative to the axial direction of the connector.

18. A connector assembly, comprising:

a connector including a mother housing and a sub connector, the mother housing including a second peripheral wall that defines a second inner cavity and a second holder located in the second inner cavity and connected to the second peripheral wall, a sub connector slot is formed in the second holder, the sub connector including a sub housing, a first terminal fixed in the sub housing, and a shielding shell fixed to the sub housing and at least partially enclosing the first terminal, the sub connector is detachably inserted into the mother housing, the sub connector has a sub connecting end for electrically connecting with an electrical component and a sub mating end, the sub connector is inserted into the sub connector slot; and a mating connector mated with the connector.

19. A connector, comprising:

a mother housing; and a sub connector including a sub housing, a first terminal fixed in the sub housing, and a shielding shell fixed to the sub housing and at least partially enclosing the first terminal, the sub connector is detachably inserted into the mother housing to form a connector with the mother housing, the sub connector has a sub connecting end for electrically connecting with an electrical component and a sub mating end for electrically mating with a mating connector, a first positioning post, a first terminal pin, and a shielding pin are respectively formed on the sub housing, the first terminal, and the shielding shell of the sub connector for plugging into a plurality of corresponding holes formed in the electrical component.

20. The connector according to claim 19, further comprising a second terminal fixed in the mother housing, a function of the second terminal is different from a function of the first terminal, a second positioning post and a second terminal pin are respectively formed on the mother housing and the second terminal for plugging into the corresponding holes formed in the electrical component, the first positioning post, the second positioning post, the shielding pin, the first terminal pin, and the second terminal pin extend along the axial direction of the connector or are bent 90 degrees relative to the axial direction of the connector.

* * * * *